United States Patent
Veto (10) Patent No.: US 9,828,096 B2
(45) Date of Patent: Nov. 28, 2017

(54) MOVABLE CONTROL SURFACE EJECTION SYSTEM

(71) Applicant: The Boeing Company, Chicago, IL (US)

(72) Inventor: Christopher Veto, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/051,602

(22) Filed: Feb. 23, 2016

(65) Prior Publication Data

US 2017/0240281 A1  Aug. 24, 2017

(51) Int. Cl.
| | | |
|---|---|---|
| *B64D 1/02* | (2006.01) | |
| *B64C 5/10* | (2006.01) | |
| *B64C 9/02* | (2006.01) | |
| *B64C 27/46* | (2006.01) | |
| *B64C 9/32* | (2006.01) | |
| *B64C 9/14* | (2006.01) | |
| *B64C 9/00* | (2006.01) | |

(52) U.S. Cl.
CPC ............ *B64D 1/02* (2013.01); *B64C 5/10* (2013.01); *B64C 9/00* (2013.01); *B64C 9/02* (2013.01); *B64C 9/14* (2013.01); *B64C 9/32* (2013.01); *B64C 27/46* (2013.01); *B64C 2009/005* (2013.01)

(58) Field of Classification Search
CPC .... B64D 1/02; B64C 5/10; B64C 9/00; B64C 9/02; B64C 9/14; B64C 9/32; B64C 27/46; B64C 2009/005
See application file for complete search history.

(56) References Cited

U.S. PATENT DOCUMENTS

| | | | | |
|---|---|---|---|---|
| 4,043,526 A | | 8/1977 | Donley et al. | |
| 4,505,442 A | * | 3/1985 | Kirsch | B64C 25/54 102/411 |
| 4,971,267 A | * | 11/1990 | Fulton | B64C 13/24 244/99.9 |
| 8,979,018 B2 | * | 3/2015 | Pflug | B64D 1/02 244/137.4 |
| 9,010,678 B1 | * | 4/2015 | Hiller | B60F 5/02 244/2 |
| 9,180,977 B2 | * | 11/2015 | Gatzke | B64D 41/00 |
| 9,199,733 B2 | * | 12/2015 | Keennon | B64C 27/12 |
| 2006/0214064 A1 | * | 9/2006 | Caron | A63H 27/02 244/190 |

(Continued)

FOREIGN PATENT DOCUMENTS

| | | | | |
|---|---|---|---|---|
| EP | 2236975 A2 | * | 10/2010 | ............... B64D 1/04 |
| EP | 2450155 A1 | * | 5/2012 | ............... B23P 9/04 |

*Primary Examiner* — Tuan C. To (74) *Attorney, Agent, or Firm* — Haynes and Boone, LLP (57) ABSTRACT

Systems and methods are provided for decoupling movable control surfaces. Such systems may detect that a movable control surface is in a non-responsive state, such as a hard-over, and decouple the movable control surface from the main, fixed, control surface. The control surfaces may be coupled to an aircraft. A controller of the aircraft may detect the nonresponsive movable control surface, provide instructions to decouple the movable control surface, and compensate for the decoupling of the movable control surface in instructions provided to flight systems of the aircraft.

22 Claims, 9 Drawing Sheets

(56) References Cited

U.S. PATENT DOCUMENTS

| | | | |
|---|---|---|---|
| 2007/0095987 A1* | 5/2007 | Glezer | B64C 21/08 |
| | | | 244/200.1 |
| 2007/0145180 A1* | 6/2007 | Johnson | B64C 13/42 |
| | | | 244/13 |
| 2010/0076625 A1* | 3/2010 | Yoeli | B60V 1/043 |
| | | | 701/4 |
| 2011/0255968 A1* | 10/2011 | Recksiek | B64D 45/0005 |
| | | | 416/23 |
| 2012/0193479 A1* | 8/2012 | Roscoe | B64D 37/08 |
| | | | 244/135 R |
| 2013/0310994 A1* | 11/2013 | Schroeter | B64D 41/00 |
| | | | 700/287 |
| 2014/0346273 A1* | 11/2014 | Nelson | B64C 25/34 |
| | | | 244/102 A |

* cited by examiner

MOVABLE CONTROL SURFACE EJECTION SYSTEM

TECHNICAL FIELD

The disclosure relates generally to aircraft control surfaces and more particularly to techniques for responding to non-responsive movable aircraft control surfaces.

BACKGROUND

Aircraft, including airplanes and helicopters, generally include various types of movable control surfaces such as flaps, ailerons, flaperons, elevators, rudders, wing tips, spoilers, tabs, slats, air brakes, and/or sleeves. Such movable control surfaces may, in certain instances, become nonresponsive. For example, hydraulic control circuits may become jammed, electrical circuits may be disconnected or severed, mechanical joints and/or connections may become disconnected or stuck, movable control surfaces may be iced over or otherwise damaged due to other environmental damage, and/or other additional failures may cause movable control surfaces to become non-responsive.

A hard-over is an example of a non-responsive state for a movable control surface. In a hard-over, a movable control surface may be permanently stuck in a certain position. The position may be, in the example of an aileron or flap, fully up or down, or some angle in-between. Such a non-responsive movable control surface may render the aircraft, more difficult to control and may also increase drag.

SUMMARY

Systems and methods are disclosed herein for movable control surface ejection system. In certain examples, a system may be provided. The system may include an aircraft control surface including a main control surface body and one or more movable control surf ace bodies and a controller. The movable control surface body may be configured to output position data to a controller and may be coupled to a release mechanism configured to couple, during normal operation, the movable control surface body to the main control surface body, allow for movement of the movable control surface body relative to the main control surface body, and decouple the movable control surface body from the main control surface body responsive to a decouple command communicated by the controller. The controller may be communicatively connected to the aircraft control surface and configured to receive the position data, determine, from the position data, that the movable control surface body is in a non-responsive condition, and provide the decouple command to the release mechanism to decouple the movable control surface body from the main control surface body.

In certain additional examples, a method may be provided. The method may include receiving position data from a movable control surface body, determining that the movable control surface body is in a nonresponsive condition, and decoupling, via a release mechanism, the movable control surface body front a main control surface body. The movable control surface body may be coupled to the main control surface body via the release mechanism configured to couple, during normal operation, the movable control surface body to the main control surface body, allow for movement of the movable control surface body relative to the main control surface body, and decouple the movable control surface body from the main control surface body.

The scope of the invention is defined by the claims, which are incorporated into this section by reference. A more complete understanding of the disclosure wall be afforded to those skilled in the art, as well as a realisation of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Aircraft control surfaces (e.g., wings, stabilizers, tails, thrusters, and/or other control surfaces) may include movable control surfaces (e.g., flaps, ailerons, flaperons, elevators, rudders, wing tips, spoilers, tabs, slats, air brakes, canards, rotor-blades, thrust-vectoring nozzle paddles, and/or sleeves). Such movable control surfaces may become non-responsive, such as during a hard-over (e.g., when a control surface is stuck in a fully up or down position). Non-responsive movable control surfaces may render the aircraft more difficult to control and may also increase drag. A movable control surface ejection system may allow an aircraft experiencing a nonresponsive movable control surface to be more controllable and/or efficient.

Various examples of a movable control surface ejection system are described herein. In certain examples, such movable control surface ejection systems and techniques may be known as a Mechanically Operated Unit Losing Technique ("MOULT"). The movable control surface ejection system may be used on vehicles. In certain examples, the vehicle may be an aircraft (e.g., an airplane, a helicopter, a spacecraft, an airship), a ground effect vehicle (e.g., an ekranoplan), a hovercraft, a sea-craft, a submersible, a hypersonic vehicle, a supersonic vehicle, a re-entry vehicle, and/or another vehicle. The movable control surface ejection system may include a release mechanism that may couple one or more movable control surfaces to a main control surface body. The release mechanism may also decouple the movable control surface body from the main control surface body when a decouple command is given to the release mechanism, such as when a movable control surface body is determined to be non-responsive. When the movable control surface body is decoupled from the main control surface body, it may be ejected (e.g., fall away) from the main control surface body. After the son-responsive movable control surface body has been ejected, the vehicle may then adjust commands given for the movement of the remaining movable control surface bodies to compensate for the loss of the ejected movable control surface body.

Figure 1:
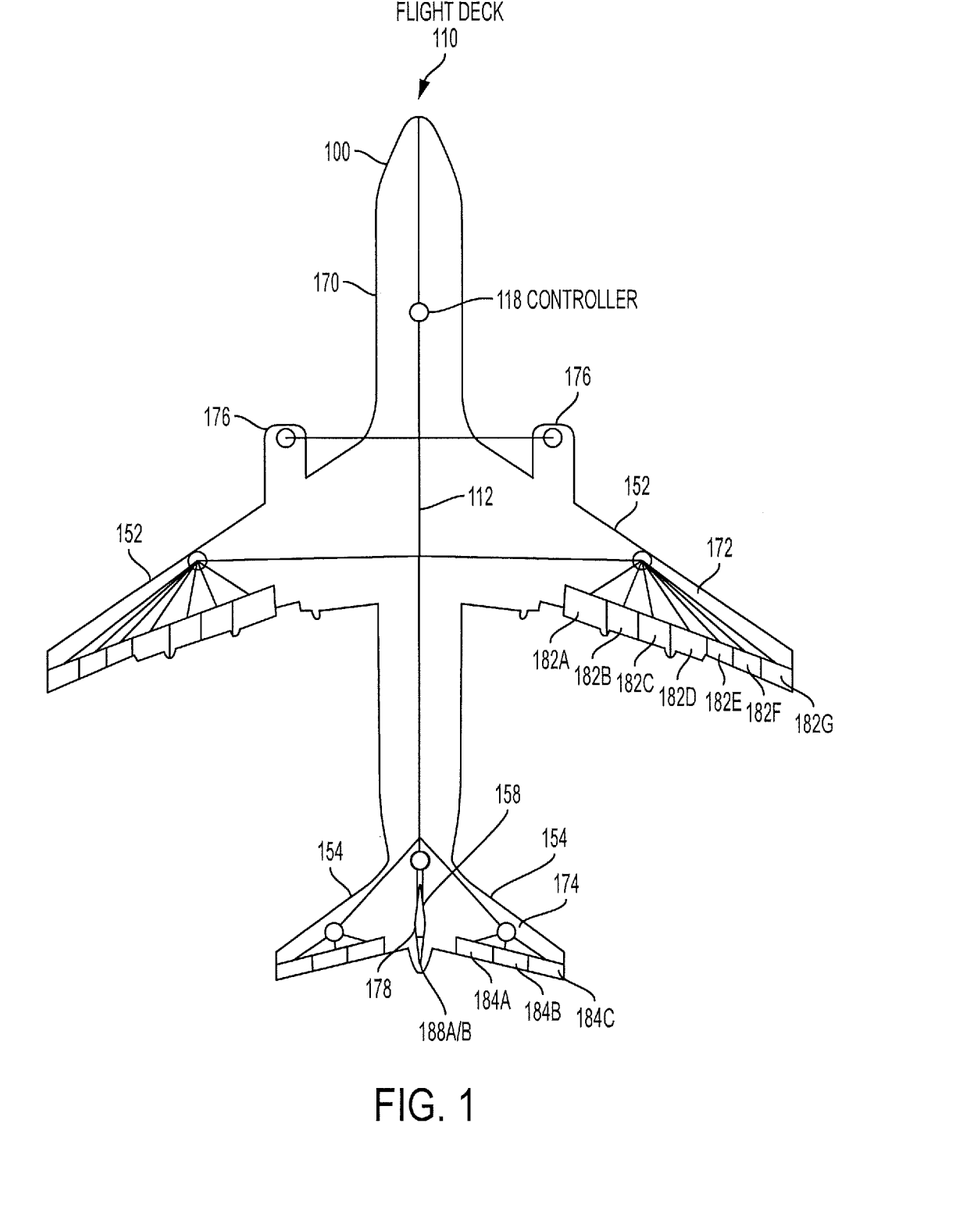
FIG. 1 illustrates an example aircraft in accordance with an example of the disclosure.

FIG. 1 illustrates an example aircraft in accordance with an example of the disclosure. The airplane 100 of FIG. 1 may include a fuselage 170, wings 152, the horizontal stabilizers 154, the vertical stabilizers 158, aircraft engines 176 and a flight deck 110. The wings 152 may each include a main control surface body 172 that may be fixed to the fuselage 170 and movable control surface bodies 182A-G. In certain embodiments, the fuselage 170 and, at least, the wings 152 may be integrated as a blended-wing-body configuration. The horizontal stabilizers 154 may each include a main control surface body 174 and movable control surface bodies 184A-C. The vertical stabilizer 158 may include a main control surface body 178 as well as movable control surface bodies 188A/B.

The flight deck 110 of the airplane 100 may include controls chat may be manipulated by the pilot (s), by ground operation, and/or by autonomous algorithms of the airplane 100 to provide instructions for the operation of the aircraft. For example, the flight deck 110 may include a control or controls for determining the throttle position or wing configuration of the aircraft. The flight deck 110 may also include controls for determining a configuration of the horizontal stabilizer or other aerodynamic device of the airplane 100 as well as the configuration of the vertical stabilizer.

Additionally, the aircraft 100 may include a controller 118. The controller 118 may include, for example, a single-core or multi-core processor or microprocessor, a microcontroller, a logic device, a signal processing device, memory for storing executable instructions (e.g., software, firmware, or other instructions), and/or any elements to perform any of the various operations described herein. In various examples, the controller 118 and/or its associated, operations may be implemented as a single device or multiple devices (e.g., communicatively linked through wired or tireless connections such as the digital communication, analog communication, and/or fiber optics channel 112) to collectively constitute the controller 118.

The controller 118 may include one or more memory components or devices to store data and information. The memory may include volatile and non-volatile memory. Examples of such memories include RAM (Random Access Memory), ROM (Read-Only Memory), EEPROM (Electrically-Erasable Read-Only Memory), flash memory, or other types of memory. In certain examples, the controller 118 may be adapted to execute instructions stored within the memory to perform various methods and processes described herein, including implementation and execution of control algorithms responsive to sensor and/or operator (e.g., flight crew) inputs.

The controller 118 may be communicatively coupled to various components of the aircraft 100 via the communications network 112. The communications network 112 may, for example, be a wired communication circuit or a wireless communications system. The communications network 112 may link the various components to the controller 118. For example, the communications network 112 may be connected to sensors embedded within, coupled to, or associated with the movable control surface bodies 182A-G, 184A-C, and 188A/B. Such sensors may detect when one or more of the movable control surface bodies 182A-G, 184A-C, and 108A/B are in a non-responsive condition and communicate such conditions to the controller 118 through the communications network 112. The controller 118 may, additionally, provide instructions through the communications network 112 to release mechanisms associated with one or more of the movable control surface bodies 182A-G, 184A-C, and 188A/B to decouple movable control surface bodies determined to be in a non-responsive condition from the main control surface body.

The controller 118 may receive instructions from various controls within the flight deck 110 (e.g., actuation of a joystick or thrust lever) through the communications network 112, determine a response, and provide, via the communications network 112, instructions associated with the response to the wings 152, horizontal stabilizers 154, vertical stabilizer 158, and/or aircraft engines 176 associated with the operation of the aircraft 100 such as instructions to move ailerons, flaps, flaperons, and/or rudders of the aircraft control surfaces and/or instructions to change the throttle opening of one or more the aircraft engines 176. As such, the controller 118 may, for example, provide instructions for the aircraft engines 176 to throttle up or throttle down and provide instructions to the wings 152, the horizontal stabilizers 154, and/or the vertical stabilizers 158 to move (e.g., translate and/or rotate) the movable control surface bodies 182A-G, 134A-C, and/or 188A/B.

Figure 2:
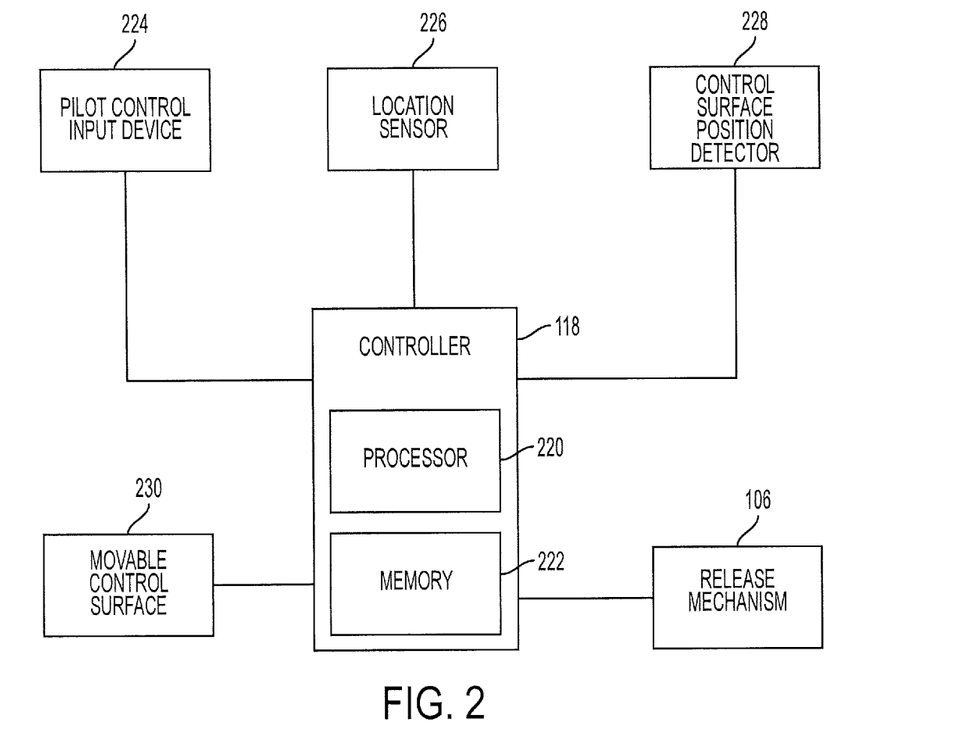
FIG. 2 illustrates a block diagram of a movable control surface ejection system in accordance with an example of the disclosure.

FIG. 2 is a block diagram illustrating a movable control surface ejection, system in accordance with an example of the disclosure. FIG. 2 illustrates a controller 118 that includes a processor 220 and a memory 222. The controller 118 may be communicatively coupled to an pilot control input device 224, a location sensor 226, a control surface position and/or rate detector 228, a movable control surface 230, and a release mechanism 106.

The pilot control input device 224 may be, for example, a joystick, yoke, thrust lever, pedals, buttons, touchscreens, multi-functional screens, steering wheel, toggle switches, retinal cracking, voice command, and/or other input devices. The pilot control input device 224 may foe located within the flight deck 110.

The location sensor 226 may be, for example, a global position sensor or other device (e.g., accelerometer, gyroscope, compass, star-tracker communications from ground based location determining services such as air traffic control) that may determine the location of the aircraft 100.

The control surface position detector and/or rate detector 228 may determine a position and/or movement rate of the movable control surface 230 and may also determine if the movable control surface 230 is non-responsive to commands communicated from the controller 118. In certain, examples, the movable control surface 230 may be coupled to a main control surface that may be fixed to the fuselage 170 or another portion of the aircraft 100. The movable control surface may be configured to move between a plurality of positions or may be analog and may thus move between an infinite number of different positions between two positional limits (e.g., if an aileron may move between 40 degrees up and 50 degrees down, an analog aileron may move to any angle between 40 degrees up and 50 degrees down). If the movable control surface 230 is determined to be non-responsive, the controller 118 may communicate a decouple command, to the release mechanism 106 to decouple the movable control surface 230 from the main control surface.

Figure 3:
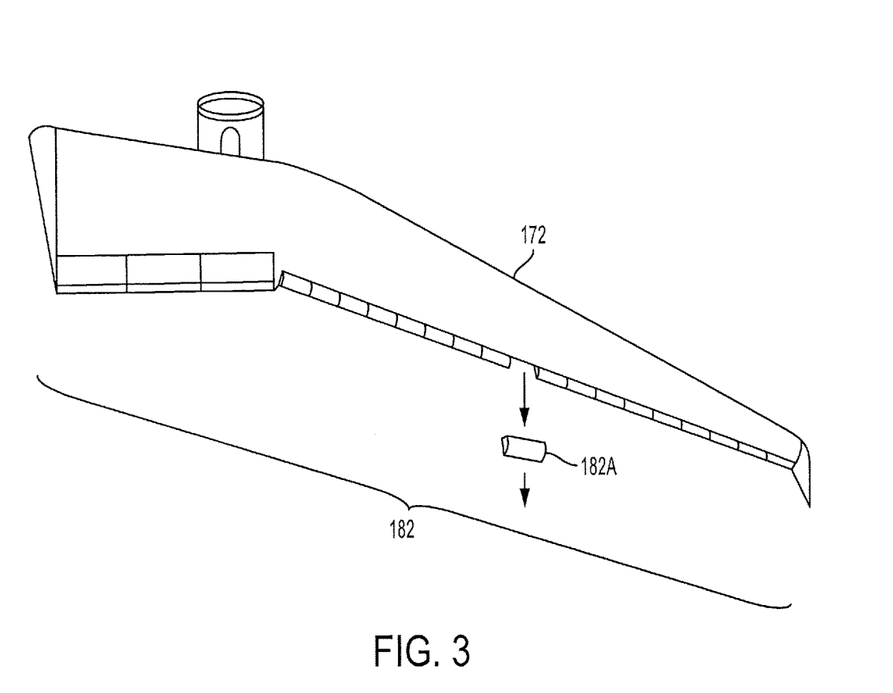
FIG. 3 illustrates an airplane wing with a movable control surface ejection system in accordance with an example of the disclosure.

FIG. 3 illustrate an airplane wing with a movable control surface ejection system in accordance with an example of the disclosure. FIG. 3 includes a main control surface body 172, a plurality of movable control surface bodies 182, and a movable control surface body 182A. The plurality of movable control surface bodies 182 may be a combination, of one or more of flaps, ailerons, and flaperons. In other examples, the movable control surface bodies 182 may additionally or alternatively include other types of movable control surface bodies. In certain examples, there may be more than 1, more than 5, more than 10, more 20, and/or more than 30 such, movable control surface bodies 182. In such examples, the high number of movable control surface bodies 182, used, for example, within, at least, high aspect-ratio and/or very-flexible wings, may allow decoupling of non-responsive movable control surface bodies while minimizing the aerodynamic effect that a missing movable control surface body has on the aircraft 100.

Figure 4:
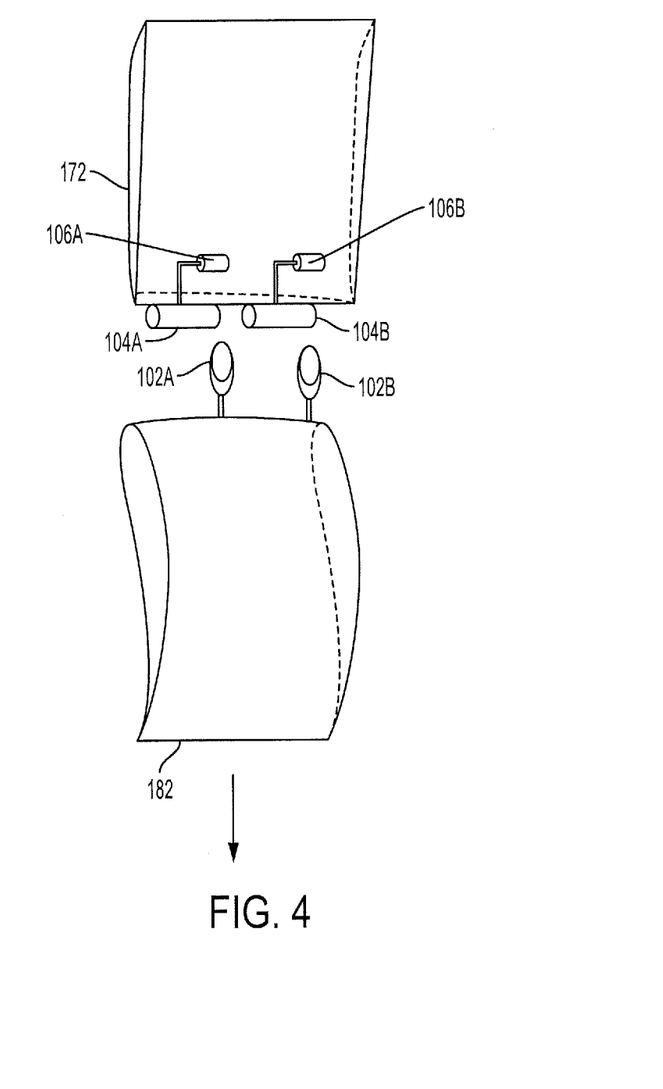
FIG. 4 illustrates an example of a movable control surface ejection system in accordance with an example of the disclosure.

In FIG. 4, the movable control surface body 182A has been decoupled from main control surface body 172. In certain examples, the movable control surface body 182A may be in a non-responsive state and the movable control surface body 182A may be decoupled after it has been detected to be in the non-responsive state. After the movable control surface body 182A has been decoupled, it may be separated from, the main control surface body due to, for example, aerodynamic drag, gravity, inertia, separation motors, pyros, ordnance, and/or other forces.

FIG. 4 illustrates an example of a movable control surface ejection system in accordance with an example of the disclosure. FIG. 4 may show an example of the wing 152 and may include a main control surface body 172, a movable control surface body 182, first joint portions 102A and 102B, second joint portions 104A and 104B, and release mechanisms 106A and 106B.

The main control surface body 172 may include the second joint portions 104A and 104B. The movable control surface body 182 may be, for example, a flap, an aileron, a flaperon, or another type of movable control surface body. The movable control surface body 182 may include the first joint portions 102A and 102B. The first joint portion 102A may be configured to couple to the second joint portion 104A and the first joint portion 102B may be configured to couple to the second joint portion 104B.

In certain examples, the first joint portions 102A and 102B may be coupled to the second joint portions 104A and 104B via a linkage. The linkage may be, for example, a circular or substantially circular, cam shaped, or other shaped rod that may be inserted between the first joint portions 102A and/or 102B and the second joint portions 104A and/or 104B. The linkage may allow the movable control surface body 182 to move relative to the main control surface body 172 by, for example, translation, rotation, and/or other motions. As such, the movable control surface body 182 may move relative to the main, control surface body to aid in controlling the flight of the aircraft 100. The linkage may be coupled to one or more release mechanisms, such as the release mechanisms 106A and 106B, or other release devices. The release mechanisms 106A and 106B, or other release devices, may decouple the first joint portions 102A and 102B from the second joint portions 104A and 104B by moving the release mechanisms 106A and 106B from a coupled position to a decoupled position. In other examples, the release mechanisms 106A and 106B may be configured to move the linkages to other additional positions (e.g., a position for servicing). In certain other examples, the linkages may include other mechanisms, such as slides, hooks (e.g., hooks that couple the first joint portion to the second joint portion), grasping mechanisms (e.g., one or both of the first joint portions and/or the second joint portions may be configured to grasp the other), bolt-and-nut fasteners, tethers, adhesives, magnetic connections, and/or other mechanisms. Any combination of such mechanisms may be used for the linkage. After the first joint portion and the second joint portion are decoupled, the movable control surface body 182 may be decoupled from the main control surface body 172 in this example. The movable control surface body 182 may, for example, fall away from the main control surface body 172 due to drag on the movable control surface body 182 and/or may be jettisoned with separation motors within the control surface body 182 and/or within the main control surface body 172.

Figure 5:
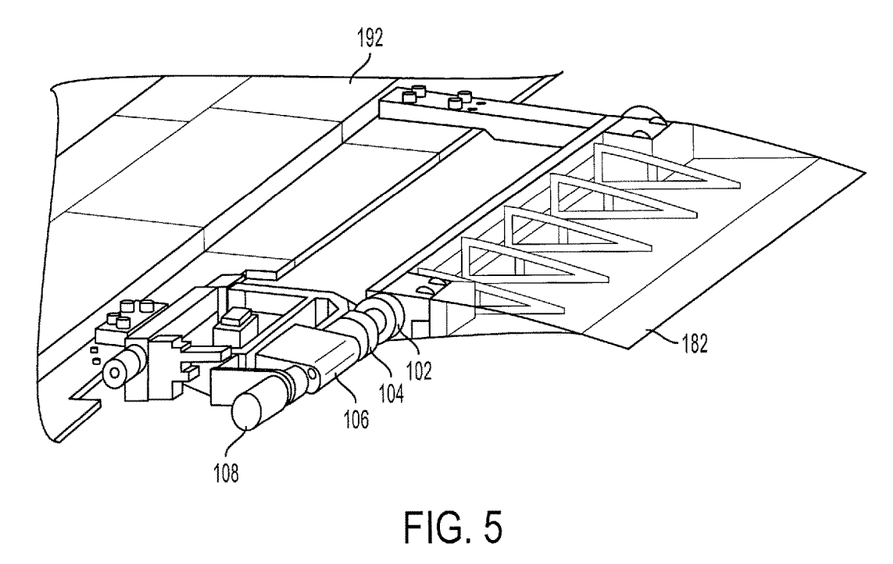
FIG. 5 illustrates an airfoil with a movable control surface ejection system in accordance with an example of the disclosure.

FIG. 5 illustrates an airfoil with a movable control surface ejection system in accordance with an example of the disclosure. FIG. 5 includes a main control surface body structure 192, the movable control surface body 182, the first joint portion 102, the second joint portion 104, the release mechanism 100, and a linkage 108.

The main control surface body structure 192 may be a structure of a main control surface body. The exterior or "skin" (be it isogrid, orthogrid, parallelogrid, or monocogue) of the main control surface body may not be shown in FIG. 5. The main control surface body structure 152 may be an internal structure of the main control surface body.

The movable control surface body 182 may be coupled to, at least, the main control surface body structure 132 via the first joint portion 102, the second joint portion 104, and the linkage 108. The first joint portion 102 may be coupled to the second joint portion 104 via the linkage 108. The linkage 108 may be coupled to the first joint portion 102 and the second joint portion 104 and, accordingly, couple the main control surface body structure 192 and the movable control surface body 182. The linkage 108 may allow the movable control surface body 182 to move relative to the main control surface body structure 192. The movable control surface body 182 may translate, rotate, or move in other manners relative to the main control surface body structure 152.

The release mechanism 106 may interact with the linkage 108 to decouple the first joint portion 102 from the second joint portion 104 and, accordingly, decouple the movable control surface body 182 from the main control surface body structure 192. The release mechanism 106 may, for example, move a position of the linkage 108, translate and/or rotate a grasping mechanism so that the grasping mechanism releases the second joint portion 104, reposition a hook, deactivate a magnetic connection, decouple due to a pneumatic connection (where, for example, the pneumatic connection may be fed by the engine 176, cabin pressurization lines, APU units, alpha-vane lines, pitot-static tubes, or other pneumatic sources), decouple due to a hydraulic connection (where, for example, the hydraulic line may be fed and/or shared with lines for actuation of ailerons, flaps, flaperons, landing gears, or other hydraulic sources), weaken or break a fastener (e.g., bolt, rivet, weld, or other such fastening technique) and/or an adhesive connection (e.g., glue of other adhesive), and/or activate an explosive charge (e.g., an explosive charge with a burn time of, for example, less than 1 second, less than 2 seconds, less than 5 seconds, or 10 seconds or more). Certain embodiments may include more than one such type of mechanism or may include redundancies (e.g., two explosive charges in case one fails). Additionally, certain release mechanism 106 may include a flap separation motor. The flap separation motor may be configured, to separate the movable control surface body 182 from the main control surface body 172 or may be included additional to other types of mechanisms. For example, the flap separation motor may further separate the movable control surface body 182 from the main control surface body 172 after an explosive charge has been activated or a pneumatic connection has been disengaged.

Figure 6:
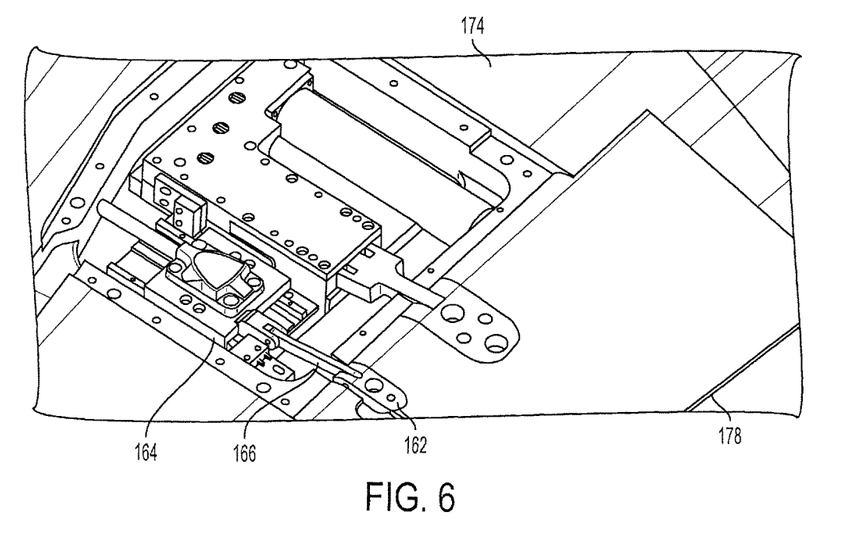
FIG. 6 illustrates a movable control surface ejection system in accordance with an example of the disclosure.

FIG. 6 illustrates a movable control surface ejection system in accordance with an example of the disclosure. FIG. 8 includes a main control surface body 174, a movable control surface body 178, a first joint portion 162, a second joint portion 164, and a linkage 166. The main control surface body 174 of the example shown in FIG. 8 may be a wing, a horizontal stabilizer, or another control surface of the aircraft 100. The movable control surface body 174 may be a flap, an aileron, a flaperon, or another such movable control surface body.

The linkage 166 may allow movement of the first joint portion 162 relative to the second joint portion 164 and may move and thus decouple the first joint portion 162 from the second joint portion 164. The first joint portion 162 and the second joint portion 164 may be a part of a linear transducer for sensing a position of the movable control surface body 174. As such, the linear transducer may be configured to determine if the movable control surface body 174 is in a non-responsive condition, such as a hard-over.

Figure 7:
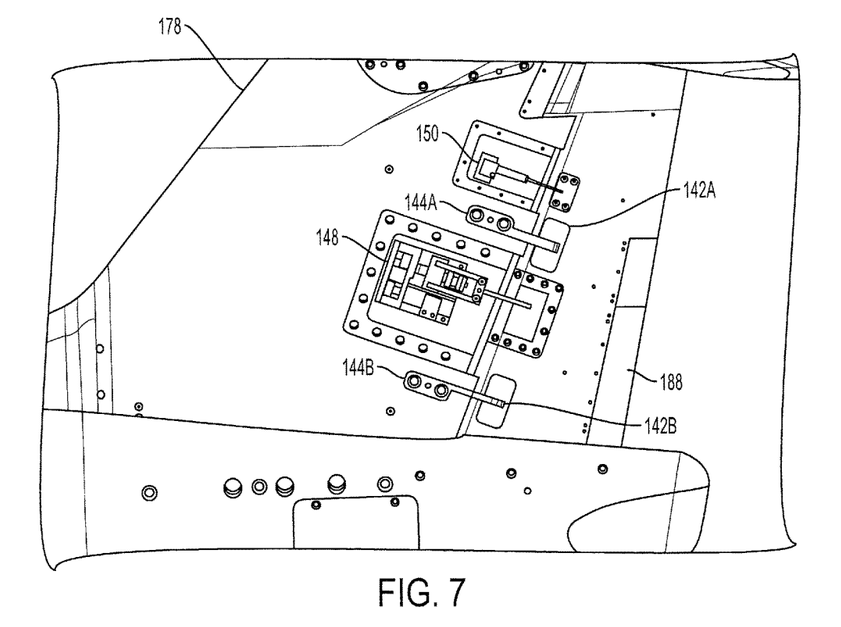
FIG. 7 illustrates a tail with a movable control surface ejection system in accordance with an example of the disclosure.

FIG. 7 illustrates the tail 158 with a movable control surface ejection system in accordance with an example of the disclosure. FIG. 7 includes the main control surface body 173, the movable control surface body 188, first joint portions 142A and 142B, second joint portions 144A and 144B, actuator 150, and a release mechanism 148.

The second joint portions 144A and 144B may couple the main control surface body 178 to the movable control surface body 188 via the first joint portions 142A and 142B. The actuator 150 may control movement of the movable control surface body 188 relative to the main control surface body 178. As such, in the example shown in FIG. 7, the actuator 150 may, for example, rotate the movable control surface body 188 to the left or right to aid in directing the aircraft 100 during flight. Other examples of the actuator may move the movable control surface body that it is attached to in other manners, such as translating, rotating, and/or moving in other ways the movable control surface body.

The release mechanism 148 may decouple the movable control surface body 188 from the main control surface body 178. The release mechanism 178 may be any release mechanism described herein. In certain examples, the release mechanism 178 may decouple the first joint portion 142A and 142B from the second joint portions 144A and 144B, respectively, to decouple the movable control surface body 188 from the main control surface body 178.

In other examples, the release mechanism 148 may, for example, decouple the movable control surface body 188 from the main control surface body 178 independently of the first joint portions 142A and 142B decoupling from the second joint portions 144A and 144B. As such, in certain examples, after the release mechanism 148 has decoupled the movable control surface body 188 from the main control surface body 178, the joint portions 142A and 142B may still be coupled to the second joint portions 144A and 144B. The joint portions may be configured such that, when the release mechanism 148 is decoupled, forces such as aerodynamic drag may then release the first joint portions 142A and 142B from the second joint portions 144A and 144B along a specific point and thus decouple the movable control surface body 188 from the main control surface body 178.

Figure 8A:
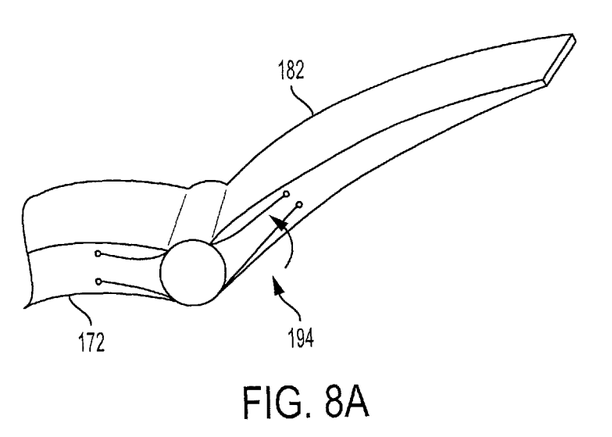
FIGS. 8A and 8B illustrates a non-response detection system of a movable control surface ejection system in accordance with an example of the disclosure.

FIGS. 8A and 8B illustrates a non-response detection system of a movable control surface ejection system in accordance with an example of the disclosure. In FIG. 8A, the main control surface body 172 is coupled to the movable control surface body 182. Additionally, the strain gauge is coupled to both the main control surface body 172 and the movable control surface body 182. The strain gauge 194 may sense a position of the movable control surface body 182 relative to the main control, surface body 172 and may, for example, determine a strain on a portion or the strain gauge 194. As such, the strain gauge 194 may, for example, detect a higher strain on a lower portion of the strain gauge 194 than on an upper portion of the strain gauge 194 when the movable control surface body 182 is in an up position. Accordingly, the strain gauge 194 may detect whether the movable control surface body 182 is in an up, down, neutral, (e.g., a normal resting position), or other position between such positions.

Figure 8B:
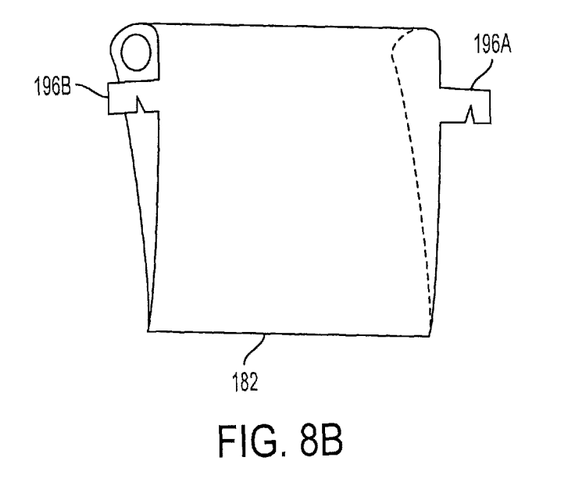

FIG. 8B illustrates edges 136A and 136S on the movable control surface body 182. The edges 196A and 196B may disconnect the strain gauges such as the strain gauge 194 when a non-responsive condition is detected with the movable control surface body 182 and the movable control surface body 182 is decoupled from the main control surface body 172 by, for example, slicing a portion of the strain gauge 194.

Figure 9:
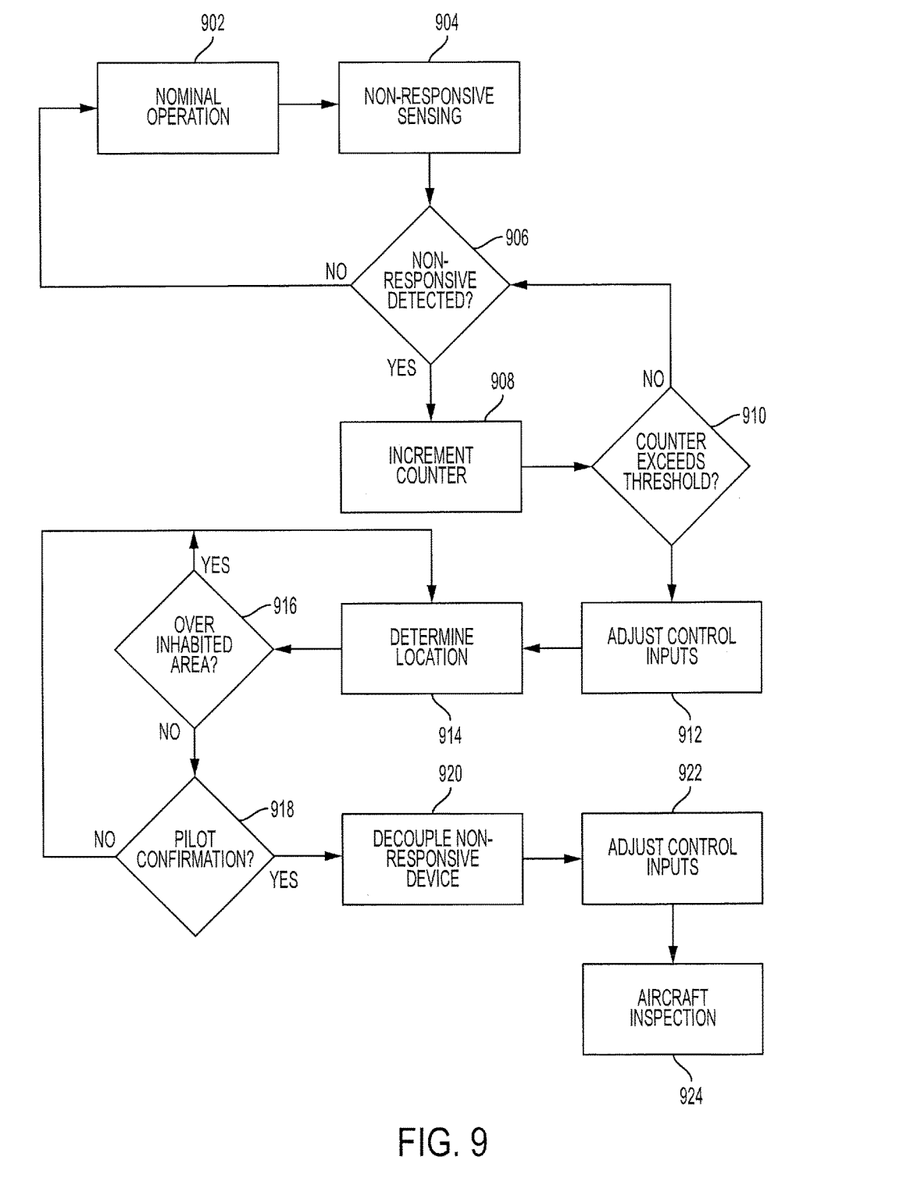
FIG. 9 illustrates a flowchart of a process of using a movable control surface ejection system in accordance with an example of the disclosure.

FIG. 9 illustrates a flowchart of a process of using a movable control surface ejection system in accordance with an example of the disclosure. In block 902, the aircraft 100 may be in normal operation. As such, the aircraft 100 may be taking off, cruising, landing, or operating in another normal state where all movable control surface bodies may be responsive.

In block 904, certain components and/or systems of the aircraft 100 may attempt to detect if certain movable control surface bodies are non-responsive. A movable control surface body may be determined to be non-responsive by, for example, the control surface position detector and/or rate detector 228. Data from the control surface position detector and/or rate detector 228 may be outputted to the controller 118 and the controller 118 may determine if a movable control surface body is in a non-responsive condition in block 906. If a movable control surface body is detected to be non-responsive in block 906, the process may continue to block 908. Otherwise, the aircraft 100 may continue normal operations in 902.

If the movable control surface body is detected to be non-responsive, a counter may be incremented and/or toggled in block 908. In certain examples, the movable control surface body may be determined to be non-responsive if one instance of a non-responsive condition is detected. In such examples, the process may skip blocks 908 and 910 and continue to block 912 if the movable control surface body is detected to be non-responsive in block 906. In certain other examples, multiple instances of detecting that the movable control surface, body is non-responsive may be required in order for the controller 118 to determine that the movable control surface body is non-responsive. In such examples, the counter may be incremented each time the movable control surface bogy is detected to foe non-responsive. In block 910, the controller 118 may determine if the counter has exceeded a threshold. The threshold may be any number of instances that the movable control surface body is detected to be non-responsive, such as 1, 2, 9 or less, 10 or less, 20 or less, or another threshold number. Certain such embodiments may require that the threshold be exceeded within a certain timeframe. As such, if the controller 118 must detect at least 10 instances of non-response from the movable control surface body within one minute in order to determine that the movable control surface body is non-responsive, if 10 instances of non-response is evenly distributed over a period of 3 minutes, the movable control surface body may not foe determined to be non-responsive.

After a movable control surface body has been detected to be non-responsive, the controller 118 may issue an additional command to move the movable control surface body, in block 90. If the movable control surface body is still detected to be non-responsive, the counter may be further incremented in block 908. If the controller 118 determines that the counter exceeds the threshold in block 910, a non-responsive condition associated with the movable control surface body may be determined and the process may then continue to block 912.

In block 912, control inputs from, for example, the pilot control input device 224 received by the controller 118 may be adjusted to compensate for the non-responsive movable control surface body. For example, a non-responsive movable control surface body may induce additional drag, lift, and/or downforce on the aircraft 100. Accordingly, instructions provided to the engine 176 and/or the various movable control surface bodies may be adjusted by the controller 113 to compensate for the non-responsive movable control surface body. For example, a non-responsive movable control surface body may be stuck in an "up" position and may thus induce downforce and drag, to compensate, the controller 118 may provide instructions to the engine 176 mounted on the same side of the aircraft 100 as the non-responsive movable control surface body to increase its thrust to compensate for the drag produced by the non-responsive movable control surface body as well as provide instructions to the remaining movable control surface bodies to provide increased lift to compensate for the downforce produced by the non-responsive, "weak-link" movable control surface body. Similarly, the control surface may be stuck in a "down" position such that it may cause lift. Such lift may be countered by adjacent movable control surface bodies by, for example, providing increased downforce and/or providing additional thrust. When the adjacent movable control surface bodies counter the non-responsive movable control surface body, the pilot may not be ready for the change in heading resulting from the increase drag, but an increase in thrust from one or more engines mounted on that side of the aircraft may minimize such changes in heading. In the absence of countering the non-responsive movable control surface bodies, the aircraft 100 may roll and the pilot may not be ready for such roll.

In block 914, a location of the aircraft 100 may be determined. The location may be determined by, for example the location sensor 226. The location may be, for example, a position such as the global position of the aircraft 100. In block 916, the controller 118 may determine if the aircraft is over an inhabited area. A list of inhabited areas may be provided by a third party, by the airline, as an indicator along with the location data received in block 914, stored within a database within the memory 222, or through other techniques. The controller 118 may, for example, compare the location detected to a list of inhabited areas and determine if the location detected is within the list. If the location is determined to be an inhabited area, the controller 118 may continue to adjust the control inputs in block 912 and may, periodically, continue to determine the location of the aircraft 100 in block 914. If the location is determined to not be an inhabited area, the process may proceed to block 913 or block 920. In certain examples, the controller 118 may additionally determine whether not decoupling the non-responsive movable control surface constitutes a high risk to the aircraft 100, say for example, if the vehicle is in a non-trim orientation/maneuver such as banking. If a high risk is determined, the process may also proceed to blocks 918 or 926.

In certain examples, pilot confirmation may be required to decouple the non-responsive movable control surface body, in such embodiments, the pilot may be alerted to a non-responsive movable control device body through, for example, an interface such as a screen, a multi-functional display, a warning light such as a warning LED or lightbulb, an audible alarm, vibrating alarm, or another technique of alerting the pilot to the presence of the non-responsive movable control surface body. The pilot may then provide an indication to decouple the non-responsive movable control, surface body through, for example, toggling a switch, pressing a button, interacting with a touchscreen or other multi-functional device, pulling a lever, moving a knob, verbal command, and/or through other techniques. The process may then proceed to block 920.

In block 920, the non-responsive movable control surface body may be decoupled from the main control surface body through techniques described herein. The non-responsive movable control surface body may then separate from the main control surface body. In certain examples, the release mechanism of the movable control surface body may be configured such that the flight path of the decoupled movable control surface body as well as any additional debris (e.g., severed actuators, strain gauges, wiring, and/or other items) is directed away from any component of the aircraft 100 (e.g., the fuselage 170, the wings 152, the horizontal stabilizers 154, the tail 158, fuel pods, canards, and/or other components). The flight paths may be adjusted according to detected conditions, such as wind direction and speed, air speed of the aircraft 100, bank angle of the aircraft 100, and other detected conditions. Any debris and/or plume resulting from pyrotechnic, explosive, or separation motors may be configured to avoid damaging components of the aircraft 100 (e.g., the fuselage 170, the wings 152, the horizontal stabilizers 154, the tail 158, fuel pods, canards, and/or other components). Additional examples may also be configured to detect any aircraft, structures, animals, and/or other items located within a certain distance of the aircraft 100 and adjust the flight path, debris, and/or plume of any decoupled items to accordingly avoid such detected aircraft, structures, animals, and/or other items.

Additionally, in certain examples, the movable control surface body may, after separation, perform certain techniques that to minimize damage from the separated movable control surface body. For example, the movable control surface body may deploy a parachute after it has separated from the main control surface body or, in examples where the movable control surface body includes flammable materials, a pyrotechnic charge may be triggered to burn the flammable materials.

After the non-responsive movable control surface body has been decoupled and separated from the main control surface body, the controller 118 may then additionally adjust control inputs received in block 922. For example, a control input may be provided to bank the aircraft 100 and the controller 118 may provide instructions for the remaining movable control surface bodies to compensate for the missing decoupled control surface body by rotating at steeper angles relative to the main control surface body to maintain the same response to the control input as that of a normally operating aircraft 100 that includes fully functional movable control surface bodies. After the aircraft 100 has landed from its flight, the aircraft 100 may then be inspected and the decoupled movable control surface body may then be replaced in block 924. For example, in certain examples, electrical connections may be inspected. Such examples may include, for example, release mechanisms that include explosive charges triggered through electrical charges and, as such, inspection in block 924 may include testing of electrical connections of the release mechanisms.

Examples described above illustrate but do not limit the invention. It should also be understood that numerous modifications and variations are possible in accordance with the principles of the present invention. Accordingly, the scope of the invention is defined only by the following claims.

What is claimed is:

1. A system comprising:
   an aircraft control surface comprising:
     a main control surface body, and
     a movable control surface body, wherein the movable control surface body is configured to output position data to a controller and is coupled to a release mechanism configured to:
       couple, during normal operation, the movable control surface body to the main control surface body;
       allow for movement of the movable control surface body relative to the main control surface body; and
       decouple the movable control surface body from the main control surface body in response to a decouple command communicated by the controller to separate the movable control surface body from the main control surface body; and
   the controller communicatively connected to the aircraft control surface and configured to:
     receive the position data,
     determine, from the position data, that the movable control surface body is in a non-responsive condition, and
     provide the decouple command to the release mechanism to decouple the movable control surface body from the main control surface body.

2. The system of claim 1, wherein the non-responsive condition is a hard-over condition.

3. The system of claim 1, wherein the aircraft control surface comprises a plurality of movable control surface bodies.

4. The system of claim 3, wherein each movable control surface body is coupled to the main control surface body via at least one release mechanism.

5. The system of claim 1, wherein the controller is further configured to provide, responsive to input received from an input device, instructions to the movable control surface body associated with positioning of the movable control surface body.

6. The system of claim 5, wherein the controller is further configured to detect that the movable control surface body is decoupled from the main control surface body.

7. The system of claim 6, wherein the aircraft control surface comprises a plurality of movable control surface bodies and wherein the controller is further configured to adjust, responsive to detecting that at least one of the movable control surface bodies is decoupled, the instructions provided to one or more coupled movable control surface bodies.

8. The system of claim 6, wherein the controller is further configured to:
   provide instructions to one or more propulsors responsive to input received from the input device; and
   adjust, responsive to detecting that the movable control surface body is decoupled, the instructions provided to the one or more propulsors.

9. The system of claim 1, wherein the aircraft control surface comprises a plurality of movable control surface bodies and wherein the controller is further configured to:
   adjust, responsive to determining that at least one of the movable control surface bodies is in a non-responsive condition and prior to providing the decoupling command, instructions to one or more responsive movable control surface bodies associated with positioning of the one or more responsive movable control surface bodies.

10. The system of claim 1, wherein the controller is further configured to:
    determine a global position of at least a portion of the system;
    determine that the global position is within a populated area; and
    prevent, responsive to the determination that the global position is within the populated area, decoupling of the movable control surface body from the main control surface body.

11. The system of claim 1, wherein the release mechanism comprises:
    a first joint portion configured to be coupled to the main control surface body;
    a second joint portion configured to be coupled to the movable control surface body; and
    a linkage configured to selectively move between a holding position to couple, during normal operation, the first joint to the second joint and a released position to decouple, upon detection of the non-responsive condition, the first joint and the second joint.

12. The system of claim 11, wherein the linkage comprises at least one of a slide, a hook, a grasping mechanism, an adhesive, a hydraulic linkage, a pneumatic linkage, and/or a magnetic connection.

13. The system of claim 1, wherein the release mechanism comprises an explosive charge.

14. The system of claim 1, wherein the movable control surface body is a flap, an aileron, a flaperon, an elevator, a rudder, a wing tip, a spoiler, a tab, a slat, a body-flap, a VTOL (Vertical Take-off and Land) blade, a canard, an air brake, and/or a sleeve.

15. The system of claim 1, wherein the position data is generated, at least in part, by a strain gauge coupled to the movable control surface body and the main control surface body, and wherein the release mechanism comprises a strain gauge release mechanism configured to sever at least a portion of the strain gauge from the main control surface body.

16. An aircraft comprising the system of claim 1, wherein the aircraft comprises a fuselage and/or blended-wing-body coupled to the aircraft control surface and a propulsor.

17. A method comprising:
    receiving position data from a movable control surface body, wherein the movable control surface body is coupled to a main control surface body via a release mechanism configured to:

couple, during normal operation, the movable control surface body to the main control surface body, allow for movement of the movable control surface body relative to the main control surface body, and decouple the movable control surface body from the main control surface body to separate the movable control surface body from the main control surface body, determining that the movable control surface body is in a non-responsive condition; and decoupling, via the release mechanism, the movable control surface body from the main control surface body.

18. The method of claim 17, wherein a plurality of movable control surfaces are coupled to the main control surface body and further comprising adjusting, responsive to decoupling at least one non-responsive movable control surface body, control instructions provided to one or more movable control surface bodies coupled to the main control surface body.

19. The method of claim 17, wherein a plurality of movable control surfaces are coupled to the main control surface body and further comprising adjusting, responsive to decoupling the at least one non-responsive movable control surface body, control instructions provided to one or more propulsors.

20. The method of claim 17, wherein the main control surface body is a portion of an aircraft and the method further comprises:

determining a global position of an aircraft;

determining that the global position is within a populated area; and preventing, responsive to the determination that the global position is within the populated area, decoupling of the movable control surface body from the main control surface body.

21. The method of claim 17, wherein the non-responsive condition is a hard-over condition.

22. The method of claim 17, wherein the position data is generated, at least in part, by a strain gauge coupled to the movable control surface body and the main control surface body, and wherein the release mechanism comprises a strain gauge release mechanism configured to sever at least a portion of the strain gauge from the main control surface body.

* * * * *

UNITED STATES PATENT AND TRADEMARK OFFICE
CERTIFICATE OF CORRECTION

PATENT NO. : 9,828,096 B2
APPLICATION NO. : 15/051602
DATED : November 28, 2017
INVENTOR(S) : Christopher Veto It is certified that error appears in the above-identified patent and that said Letters Patent is hereby corrected as shown below:

In the Detailed Description:

In Column 3, Line 11, change "son-responsive" to --non-responsive--.

In Column 4, Line 47, change "cracking" to --tracking--.

In Column 4, Line 48, change "foe" to --be--.

In Column 8, Line 66, change "bogy is detected to foe" to --body is detected to be--.

In Column 9, Line 12, change "foe" to --be--.

Signed and Sealed this
Eighteenth Day of September, 2018

Andrei Iancu
*Director of the United States Patent and Trademark Office*